US008316105B2

(12) United States Patent
Yolleck et al.

(10) Patent No.: US 8,316,105 B2
(45) Date of Patent: Nov. 20, 2012

(54) ARCHITECTURE FOR INSTALLATION AND HOSTING OF SERVER-BASED SINGLE PURPOSE APPLICATIONS ON CLIENTS

(75) Inventors: Stephen M. Yolleck, Sunnyvale, CA (US); Jay C. Jacobs, Danville, CA (US); Peter C. Diemer, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 386 days.

(21) Appl. No.: 11/726,499

(22) Filed: Mar. 22, 2007

(65) Prior Publication Data

US 2008/0235352 A1    Sep. 25, 2008

(51) Int. Cl.
*G06F 15/16* (2006.01)
(52) U.S. Cl. ........................................ 709/219; 715/738
(58) Field of Classification Search .................. 709/203, 709/219; 715/805, 810, 781, 778, 764, 738; 707/102; 345/421
See application file for complete search history.

(56) References Cited

U.S. PATENT DOCUMENTS

| 5,764,190 | A | 6/1998 | Murch et al. .................. 343/702 |
| 6,278,448 | B1 | 8/2001 | Brown et al. |
| 6,426,755 | B1 * | 7/2002 | Deering ........................ 345/581 |
| 6,546,554 | B1 | 4/2003 | Schmidt et al. |
| 6,680,705 | B2 | 1/2004 | Tan et al. ...................... 343/702 |
| 7,089,237 | B2 | 8/2006 | Turnbull et al. |
| 2001/0003824 | A1 | 6/2001 | Schnier |
| 2001/0042109 | A1 * | 11/2001 | Bolas et al. ................... 709/219 |
| 2001/0054020 | A1 * | 12/2001 | Barth et al. ..................... 705/37 |
| 2002/0147645 | A1 | 10/2002 | Alao et al. |
| 2003/0084436 | A1 | 5/2003 | Berger et al. |
| 2005/0134585 | A1 * | 6/2005 | Stall .............................. 345/421 |
| 2006/0031833 | A1 | 2/2006 | Huang et al. |
| 2006/0150118 | A1 * | 7/2006 | Chaudhri et al. ............. 715/800 |
| 2006/0259870 | A1 | 11/2006 | Hewitt et al. |
| 2006/0277469 | A1 * | 12/2006 | Chaudhri et al. ............. 715/709 |
| 2007/0118813 | A1 * | 5/2007 | Forstall et al. ................ 715/805 |

(Continued)

FOREIGN PATENT DOCUMENTS

EP    1 018 779 B1    7/2000

(Continued)

OTHER PUBLICATIONS

"Gadget Development Overview", http://msdn.microsoft.com/library/default.asp?url=/library/en-us/sidebar/sidebar/overviews/gdo.asp, Date: 2007.

(Continued)

*Primary Examiner* — Jungwon Chang
(74) *Attorney, Agent, or Firm* — Microsoft Corporation

(57) ABSTRACT

Architecture for installing and hosting of remote or server-based single-purpose applications (or server gadgets) on a local client. Where the client supports client gadgets that are available all the time, the server gadgets can now be installed and utilized on the client. Once installed in the client gadget framework, server gadgets can be docked or undocked. The server gadgets can be added to the client gadget framework with no modifications, and will continue to run as if running on the server. Components of the architecture include a browser plug-in (e.g., browser helper object (BHO)) that provides added functionality for the browser being employed, a client hosting application for hosting server gadgets on the client, and methods by which the client hosting application can interact with the server gadget and the server gadget can interact with the client hosting application. An installer is provided to install these components.

20 Claims, 12 Drawing Sheets

U.S. PATENT DOCUMENTS

| | | | |
|---|---|---|---|
| 2008/0034314 A1* | 2/2008 | Louch et al. | 715/778 |
| 2008/0040426 A1* | 2/2008 | Synstelien et al. | 709/203 |
| 2008/0120325 A1* | 5/2008 | Davis | 707/102 |
| 2008/0126958 A1* | 5/2008 | Louie | 715/764 |
| 2008/0168382 A1* | 7/2008 | Louch et al. | 715/781 |

FOREIGN PATENT DOCUMENTS

| | | |
|---|---|---|
| EP | 1 108 616 A2 | 6/2001 |
| WO | WO 01/82412 A2 | 1/2001 |

OTHER PUBLICATIONS

Allen Scott, K., "Developing Gadgets for the Windows Sidebar", Date: 2004, http://www.odetocode.com/Articles/463.aspx.

Smith, Keith, "Simplifying Ajax-Style Web Development", Date: May 2006, http://lesia.com/content/articles/SimplifyingAjaxWebDevelopment.pdf.

* cited by examiner

ARCHITECTURE FOR INSTALLATION AND HOSTING OF SERVER-BASED SINGLE PURPOSE APPLICATIONS ON CLIENTS

BACKGROUND

The Internet serves as the means for providing a wide variety of services for businesses as well as personal users. Users no longer need to watch television or read the newspaper for the news, sports, headlines or the weather, for example, but can readily find and access the desired information online. However, as easy as it has become to find information via the Internet, users prefer more effective and efficient means for accessing the desired information. When a user reboots, checking for new mail, the latest news stories, and a weather forecast means launching three different applications; an email program for mail, an RSS (really simple syndication) aggregator for news stories, for example, and a web browser for the weather, all of which add time to the start-up process.

One conventional means for providing quick access to information is by adding a shortcut to a client desktop that when selected, quickly launches an application (e.g., a browser) and routes the user interface (UI) to the desired information. However, even this process begins to take more time and effort than an experienced user desires.

More recent techniques for minimizing the user interaction for routinely accessing the same information eliminate the shortcut process by employing mini-applications, or lightweight single-purpose applications (e.g., gadgets). A gadget is a mini-application or single-purpose application that can be comprised of images and style sheets. The gadget usually requires runtime support from a host framework in order to run. Three basic types of web gadgets include RSS feed gadgets, first party gadgets, and third party gadgets. Web gadgets are displayed and operate when the user is at an associated webpage in a browser. Client-based gadgets run on the client and use a client object model as the host framework. Client gadgets can be docked at a certain location of the client UI or undocked (e.g., for floating on the desktop). Client gadgets can be visible at all times and do not require a browser. However, more flexibility in the use of single-purpose applications is desired.

SUMMARY

The following presents a simplified summary in order to provide a basic understanding of novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture facilitates the installation and hosting of remote or server-based single-purpose applications (SPAs) (hereinafter referred to as server gadgets) on a local client. Where the client supports client gadgets, the server gadgets can now be installed and utilized on the client outside of a browser. Once installed in the client gadget framework, server gadgets such as web gadgets, for example, can be docked or undocked similar to the functionality of the client-based gadgets. The server gadgets can be added to the client gadget framework with no modifications, and the server gadgets will continue to run as if running on the server. Moreover, the server gadget author can make the server gadget client aware and show a different presentation when docked or undocked.

Components of the architecture include a browser plug-in (e.g., browser helper object (BHO)) that provides added functionality for the browser being employed, a client hosting application for hosting server gadgets on the client, and methods by which the client hosting application can interact with the server gadget and the server gadget can interact with the client hosting application. An installer is provided to install these three components.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
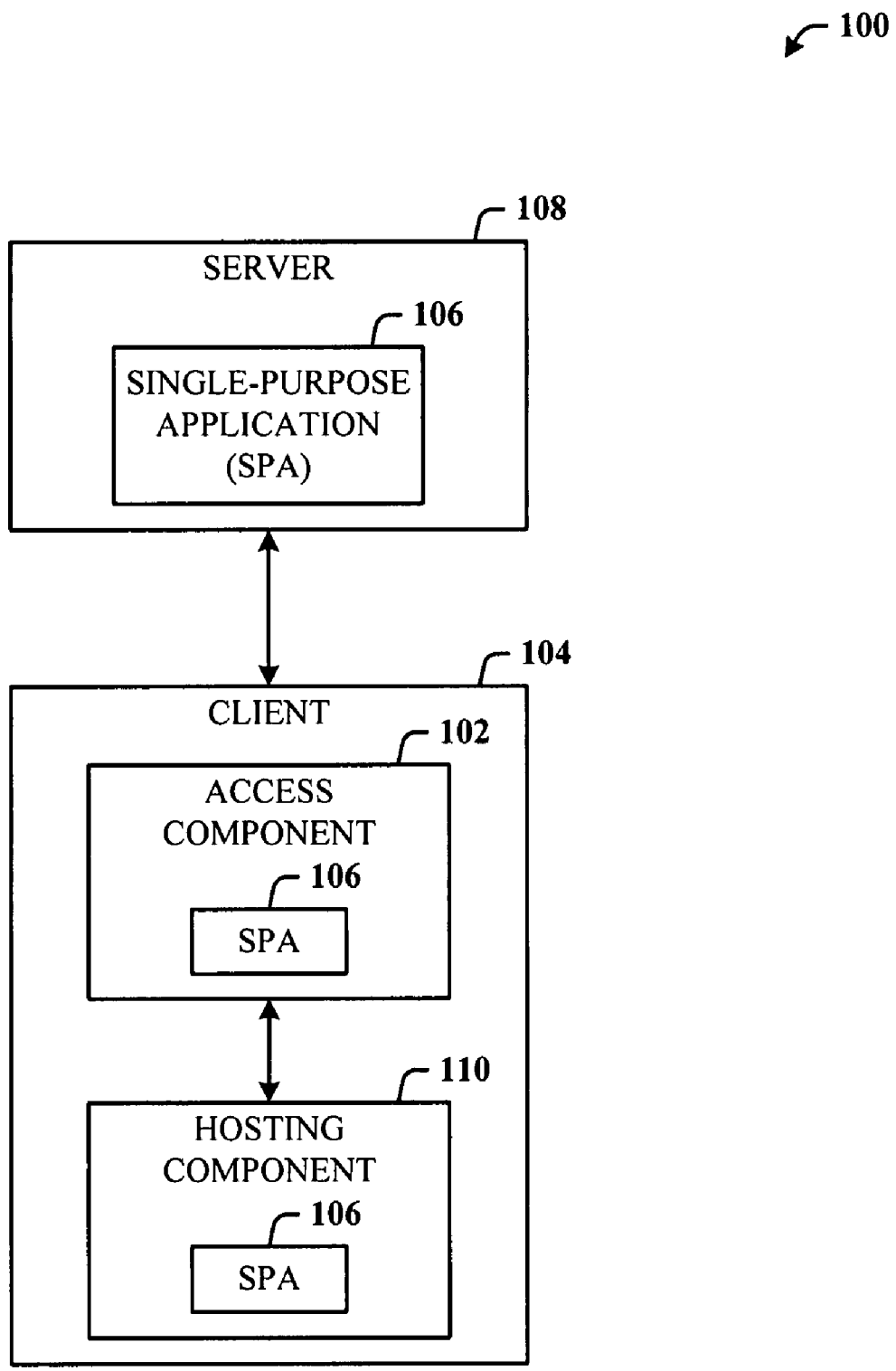
FIG. 1 illustrates a computer-implemented system for managing applications.

The disclosed architecture facilitates the selection, download, installation and operation of server-based (e.g., web) single-purpose applications (SPAs) (also commonly referred to as gadgets, widgets, etc.) on a client. Thereafter, the server-based SPAs function on the client. A gadget is an application that can be comprised of HTML (including images and style sheets) and JavaScript. A gadget usually requires runtime support from some kind of framework (a "host") in order to run. Basic types of web gadgets include RSS (really simple syndication) feed gadgets, first-party gadgets, and third-party gadgets.

Conventionally, web gadgets are displayed and operational only when the user is in a browser viewing a gadget homepage. Moreover, conventionally, client gadgets run on a client, and web gadgets run in a browser. Both the web and client gadgets can use an object model (e.g., based on COM) as a hosting framework. Client gadgets can be docked (fixed at a location on the user interface (UI) or undocked (floating on the UI). Gadgets are visible all the time and do not require a browser to present the desired information to the user. Additionally, conventionally, a user must be visiting the gadget webpage in a browser in order to enjoy the benefits of the web gadgets.

The disclosed novel architecture makes it possible to install and host web gadgets (as well as other types of gadgets, e.g., WPF-Windows presentation foundation) on the client so that the gadgets are available at all times. Once installed on the client, the web gadgets can be docked or undocked similar to client gadgets. Moreover, server-based gadgets can be added to the client with no modifications, and will continue to run as operational on the server.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

Referring initially to the drawings, FIG. 1 illustrates a computer-implemented system 100 for managing applications. The system 100 can include an access component 102 (e.g., a browser) of a client 104 for accessing a server-based single-purpose application (SPA) 106 of a network location 108 (e.g., a website), the SPA 106 impression presented in the access component as the SPA 106. The client 104 also can include a hosting component 110 for receiving, installing, and presenting a graphical representation (or graphic) associated with the server-based SPA and the associated functionality as a client-based SPA 106 on the client 104.

Generally, in one implementation, a user directs a client browser to a server that hosts SPAs. The client user then selects one of the server SPAs for download and installation on the client. The action of selecting the server-based SPA initiates access to other mini-programs that will make the downloaded SPA self-installing and functional on the client, as if the client was viewing the functionality of the SPA while operational in the browser. Accordingly, users no longer need to go through the motions of accessing a server to view the desired SPA information associated with a server-based SPA.

Figure 2:
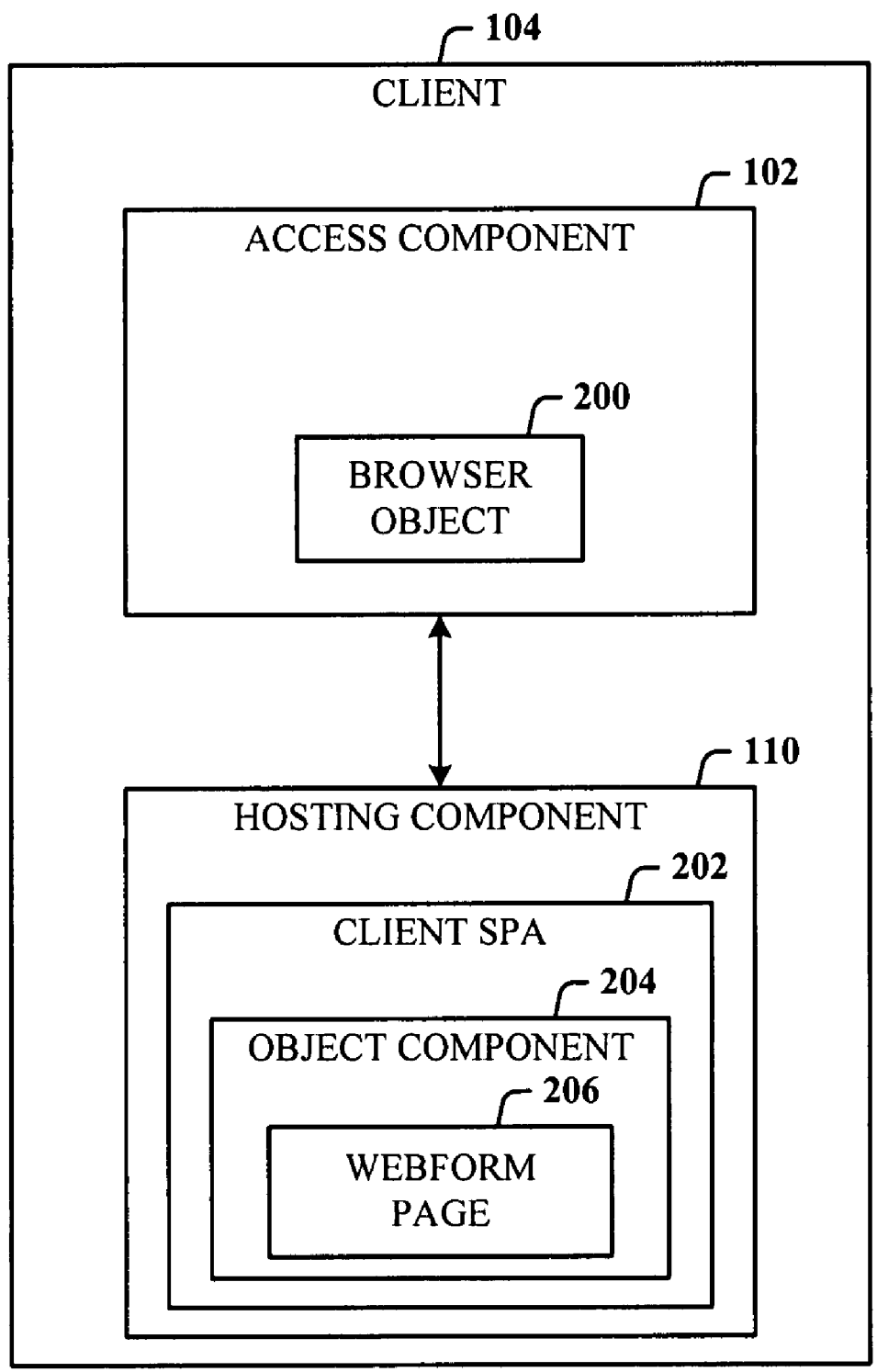
FIG. 2 illustrates a more detailed diagram of the access component and hosting component of the client system of FIG. 1.

FIG. 2 illustrates a more detailed diagram of the access component 102 and hosting component 110 of the client system 104 of FIG. 1. In this particular embodiment, the access component 102 can be a web browser for facilitating access by the client 104 to a server page that presents one or more SPAs for selection and download. In support of selection, download, and installation, the access component 102 can include a browser object 200 as a plug-in for ensuring that the client 104 is suitably capable of receiving, installing and operating a server-based SPA in accordance with the disclosed architecture.

The hosting component 110 can further include a client-side hosting gadget 202 (referred to as the client SPA), for hosting server-side gadgets. The client-side gadget 202 further hosts an object component 204 for providing a language-neutral means for utilizing objects across machine boundaries and environments. The object component 204 hosts a webform page 206 that can be written in HTML (hypertext markup language), XHTML (extensible HTML), or .NET, for example.

In one specific implementation, the browser object 200 is a browser helper object (BHO), which can be a plug-in for a browser commonly known as Internet Explorer™ by Microsoft Corporation. The BHO knows when the user is on a gadget (or SPA) server webpage, and responds to user interactions such as dragging a server gadget, or selecting a menu option to "Add a gadget" to the client 104. Note that the BHO can be written in the C++ programming language.

The client SPA 202 is a client hosting application for hosting the server-based gadget. In one embodiment, the client SPA 202 performs this function by way of the object component 204 being an ActiveX™ control (an OLE-object linking and embedding control), which in turn hosts the server-based gadget. The client SPA 202 is loaded by the hosting component 110 and responds to events such as dock/undock. In a docked mode the client SPA 202 suppresses the server-based gadget header and footer sections, and supplies a title for the gadget. In an undocked mode, the gadget's complete UI is shown so that the gadget perceived as a floating, client-side version of the server-based gadget, as presented on the gadget server.

The ActiveX control is a standard COM (component object model) control that can be hosted in an ActiveX control container, and provides methods by which the client SPA 202 can interact with the server-based gadget, and vice-versa. The ActiveX control, itself, acts as a container for the page 206 and hosts a web browser OCX control (WebOC). OCX (OLE Control eXtension) is an independent program module that can be accessed by other programs in a Windows™ operating system environment. ActiveX supersedes OCX controls, but is backward compatible with OCX controls, which means browsers can execute OCX components. The object component (e.g., WebOC) hosts a server-based page (e.g., aspx-type file), which is designed to provide the server-based gadgets with the runtime capability for standing alone outside of the server-side webpage.

There can also be provided an installer for installing the above components (e.g., 200, 202, 204, and 206) onto the client system. The installer is invoked when the user requests to install a server-based gadget in the client hosting component 110 for the first time.

Figure 3:
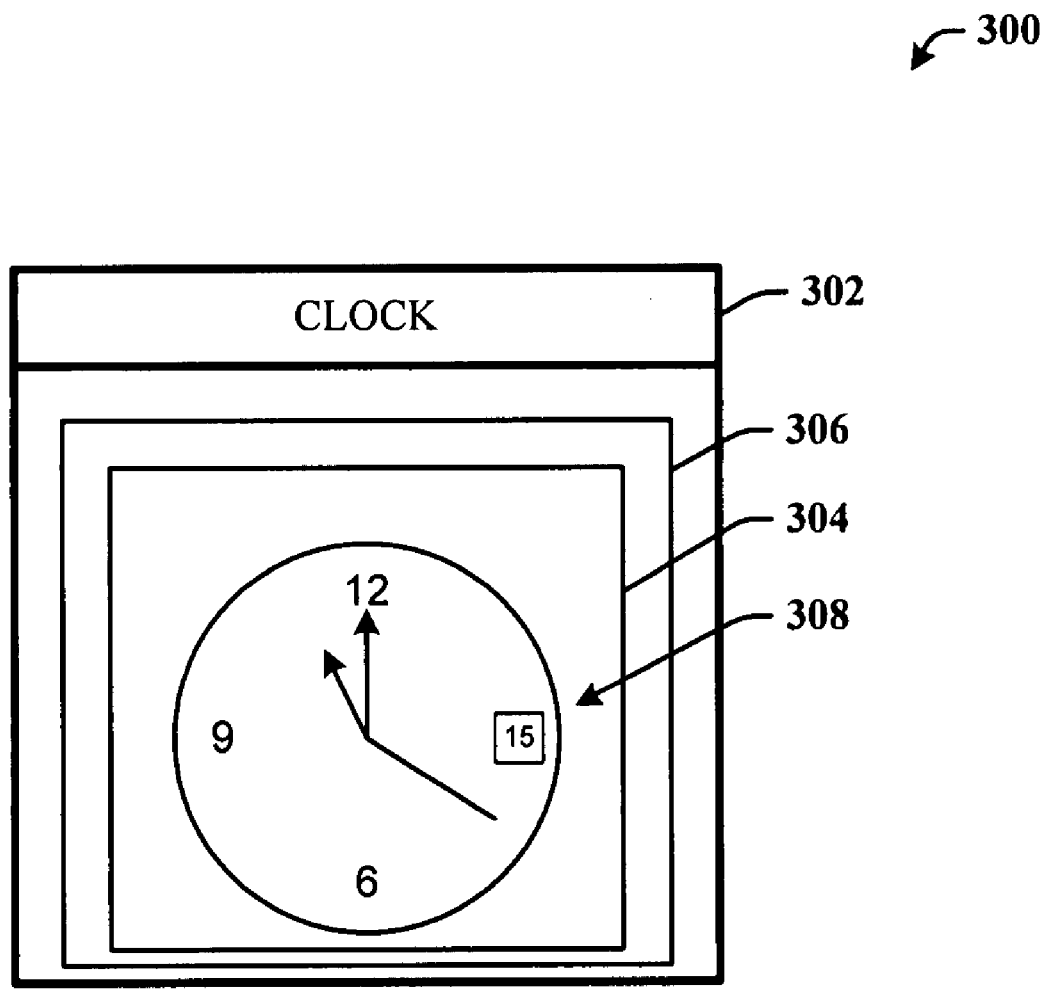
FIG. 3 illustrates multiple layers of containers used to host a server-based gadget in the client hosting application.

FIG. 3 illustrates multiple layers of containers used to host a server-based gadget 300 in the client hosting application. At runtime the client hosting application (e.g., hosting component 110) launches a first layer 302 (e.g., the client SPA 202) for all client-side gadgets. The client SPA reads an associated manifest and extracts the manifest of the server-based gadget. The client SPA 302 creates and hosts an ActiveX control 306. The ActiveX control 306 hosts a web browser control 304 that in turn loads an HTML page 308 that is the webform page 208 illustrated in FIG. 2.

The client SPA 302 passes a URL (uniform resource locator) of the manifest to the ActiveX control and, the ActiveX control creates a WebOC and loads the aspx page into the WebOC, passing the manifest URL to the aspx page (the layer 304). The aspx page then loads and renders the server-based gadget 308 (e.g., a clock face). The ActiveX control 306 extracts the client OM (object model) from its parent page (the client SPA 302) and injects the OM (or System namespace) into the aspx page. Thus, server-based gadgets now have complete access to both the server OM and the client OM. The now client-based clock gadget 300 continually updates the time from a network server. According to one security example, the system prohibits all server-based gadgets from accessing certain dangerous namespaces within the system namespace as a security measure. In summary, the layering is that the client SPA 302 hosts the control object 306 (e.g., ActiveX), which hosts the webform page 308 (e.g., aspx), which renders the server SPA 300 (or server gadget).

Figure 4:
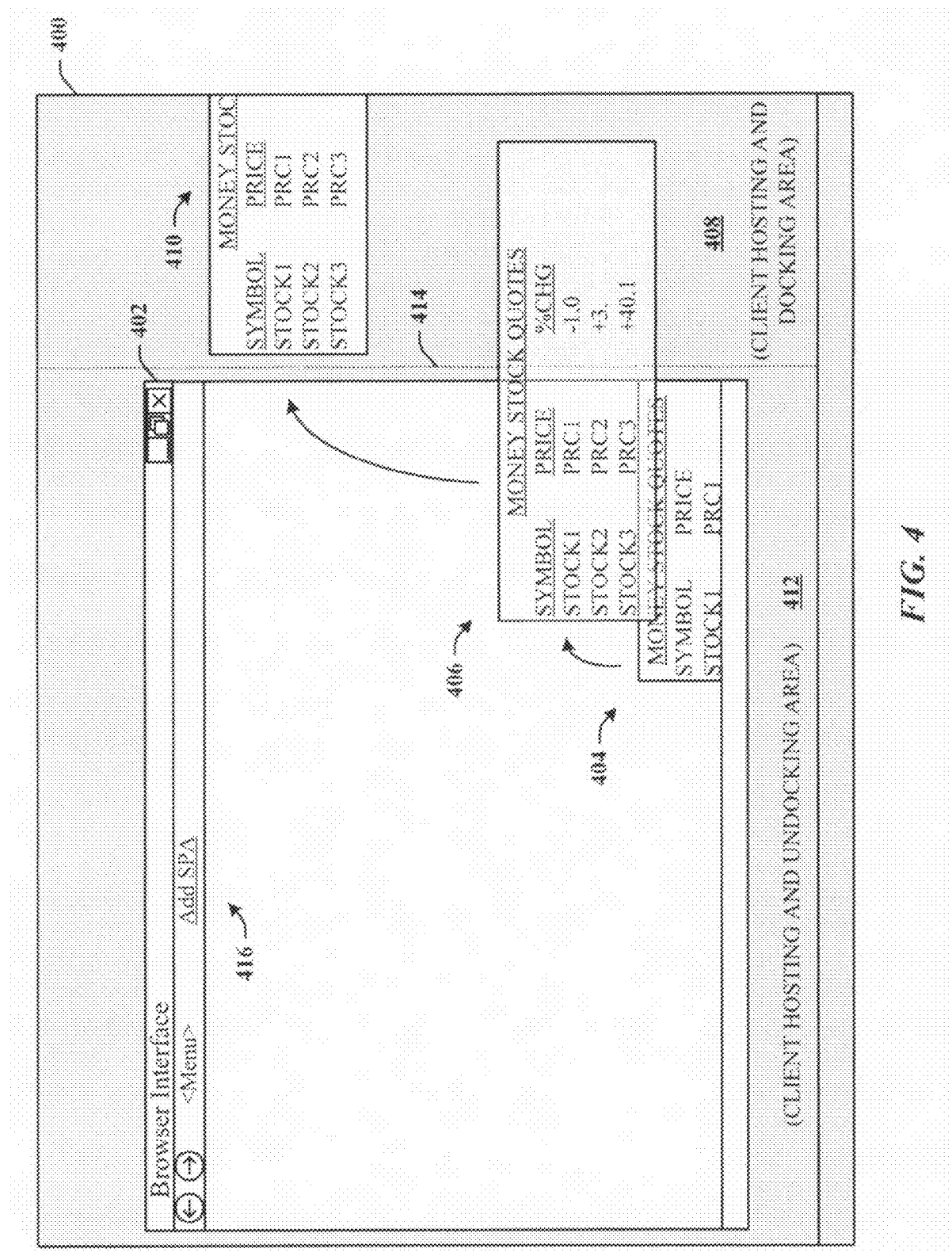
FIG. 4 illustrates a UI where gadget manipulation is associated with changes in rendering.

FIG. 4 illustrates a UI 400 (e.g., a desktop) where gadget manipulation is associated with changes in rendering. Here, the client UI 400 shows a browser interface 402 via which the client user selects a partially exposed server gadget 404 (e.g., a stock quotes) from a gadget server. When the user selects and drags the partially exposed gadget 404, the client system detects that the user is trying to drag the gadget 404. The client system then renders presentation of server gadget 404 into a temporary rendering 406, which can be a temporary bitmap window. The user drags the temporary rendering 406 around the client desktop.

For more effective feedback to the user, the temporary rendering 406 can be adjusted in a transparency setting (e.g., set to about 50% opacity) until the temporary rendering 406 is over a client hosting and docking area 408, at which time the rendering 406 transitions into a full rendering 410 (e.g., at 100% opacity). For clarity in this description, the client hosting and docking area 408 is differentiated from a client hosting and docking area 412 by a dotted demarcation line 414. However, in one implementation, the demarcation 414 is presented as a gradient of color (e.g., gray scale) from the client hosting and docking area 412 on the left-hand side of the client desktop to the client hosting and docking area 408 on the right-hand side of the client desktop. For more effective user perception, when the user hovers over the docking area 408, the docking area 408 appears to be circumscribed by a line or other means for facilitating perception by the user.

The server page can also offer a menu-based option 416 (e.g., "Add SPA") or similar type of menu-based installation option. The option 416 can be associated with a web URL that routes the client to a known location on the server (e.g., a gallery site), which is a repository for files as scripts, buttons, SPAs (e.g., gadgets), etc. In one implementation, third-party vendors can submit gadgets to this location.

The menu-based option URL can be configured to have a known prefix. If no files have been installed on a user machine (e.g., there is no browser object component 200 of FIG. 2), the browser will navigate to the URL, which can be a webpage that gives the user the opportunity to install all of the software. The system interrogates the user client to determine if the files are loaded. If not, the user can be prompted with a dialog that notifies the user that files will need to be downloaded and installed (e.g., "You have selected to install a gadget, but you need software to do so, so click here to install"). The client then installs the browser object, client SPA, object component (e.g., ActiveX control), and program installer. Thus, once the code is installed on client machine, the next time a server gadget is selected (e.g., via drag-and-drop or menu-based) for install on the client, the browser object (e.g., BHO) recognizes and intercepts the URL, thereby preventing the user from being routed to a webpage (e.g., a gadget gallery) for file download. Rather, the client simply adds the gadgets to the client hosting subsystem (e.g., hosting component 110 of FIG. 1).

As part of the file download and installation, for example, vendors can bundle a navigation tool that when installed and selected automatically navigates the user to the vendor site of gadgets based on the toolbar URL, and thereafter downloads the files to the client.

Figure 5:
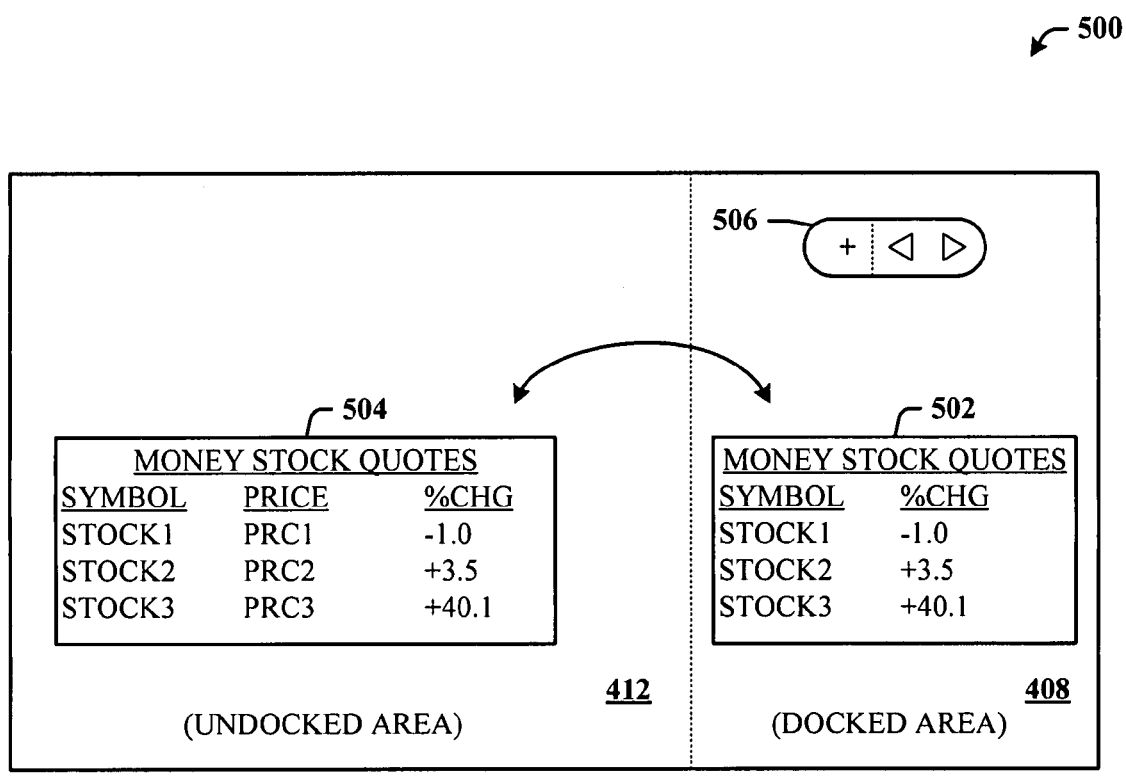
FIG. 5 illustrates a graphical representation of changes to a gadget when moving between a docked mode and an undocked mode.

FIG. 5 illustrates a graphical representation 500 of changes to a gadget 502 when moving between a docked mode and an undocked mode. A server-based gadget author can make the gadget 502 client-aware, and cause a different presentation of the gadget based on when the gadget is docked or undocked. In FIG. 5, a Money Stock Quotes server-based gadget 502 shows two columns of gadget information when in a docked mode of the client docked area 408, and transitions automatically to a three-column representation 504 of gadget information when moved into an undocked mode of the client undocked area 412. Where multiple docked gadgets are utilized, a scroll or paging navigation graphic 506 can be automatically presented for user interaction so as to access hidden gadgets (e.g., weather, sports, news, etc.) on other pages.

FIGS. 6-10 illustrate a set of methodologies associated with gadget process in accordance with the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
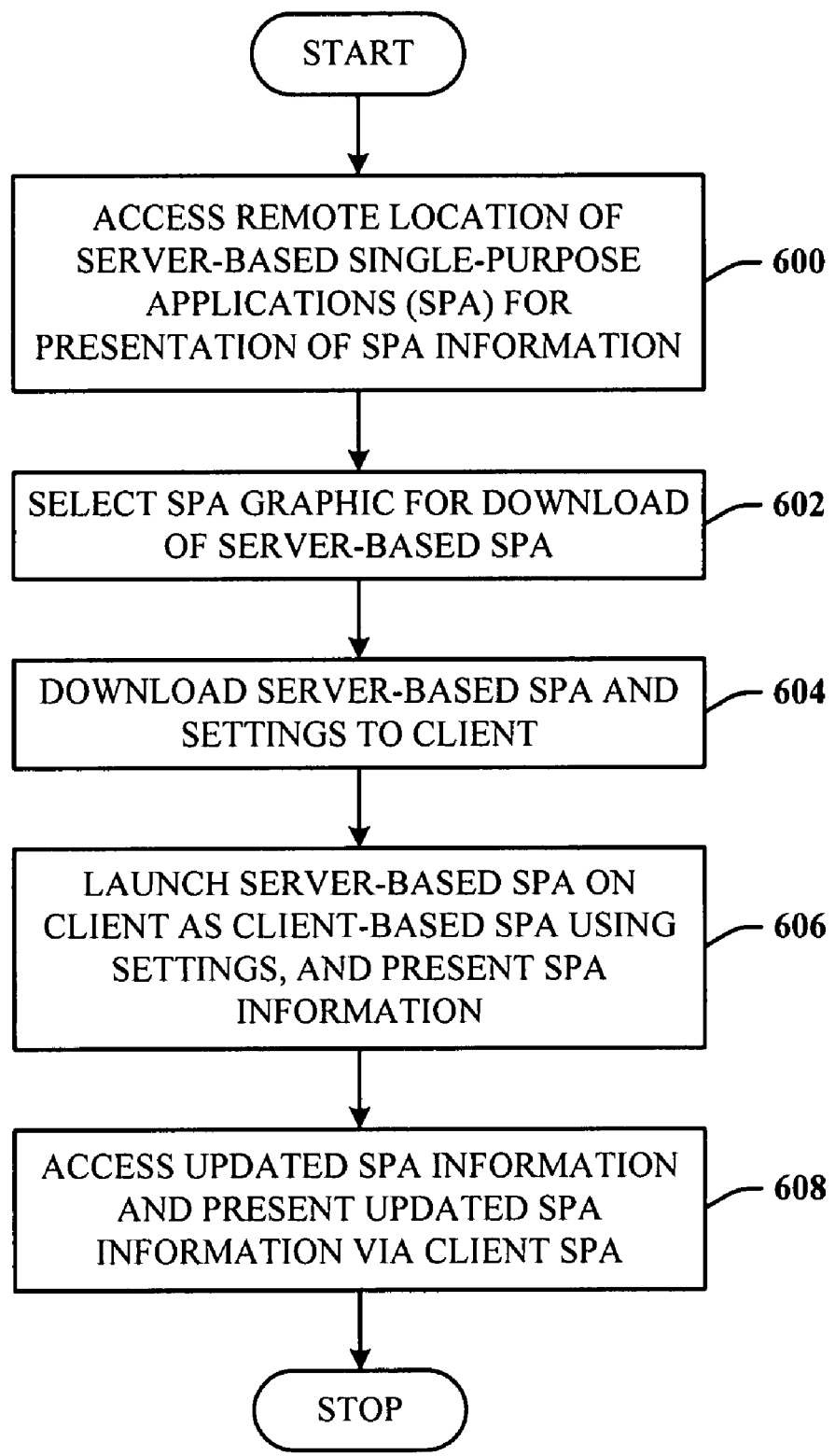
FIG. 6 illustrates a method of managing single-purpose applications.

FIG. 6 illustrates a method of managing single-purpose applications. At 600, a client accesses a remote location (e.g., a web server) of server-based SPAs (or gadgets) for the ultimate download, installation and presentation of SPA information via the client. At 602, the user selects an SPA graphic associated with the server-based SPA as a step in downloading the associated SPA. At 604, once the settings have been entered, the server-based SPA is downloaded (along with the settings) to the client. At 606, the client automatically installs and launches the SPA on the client, and presents the SPA information according to the settings. At 608, the now server-based SPA updates the SPA information and presents the updated SPA information via the client.

Figure 7:
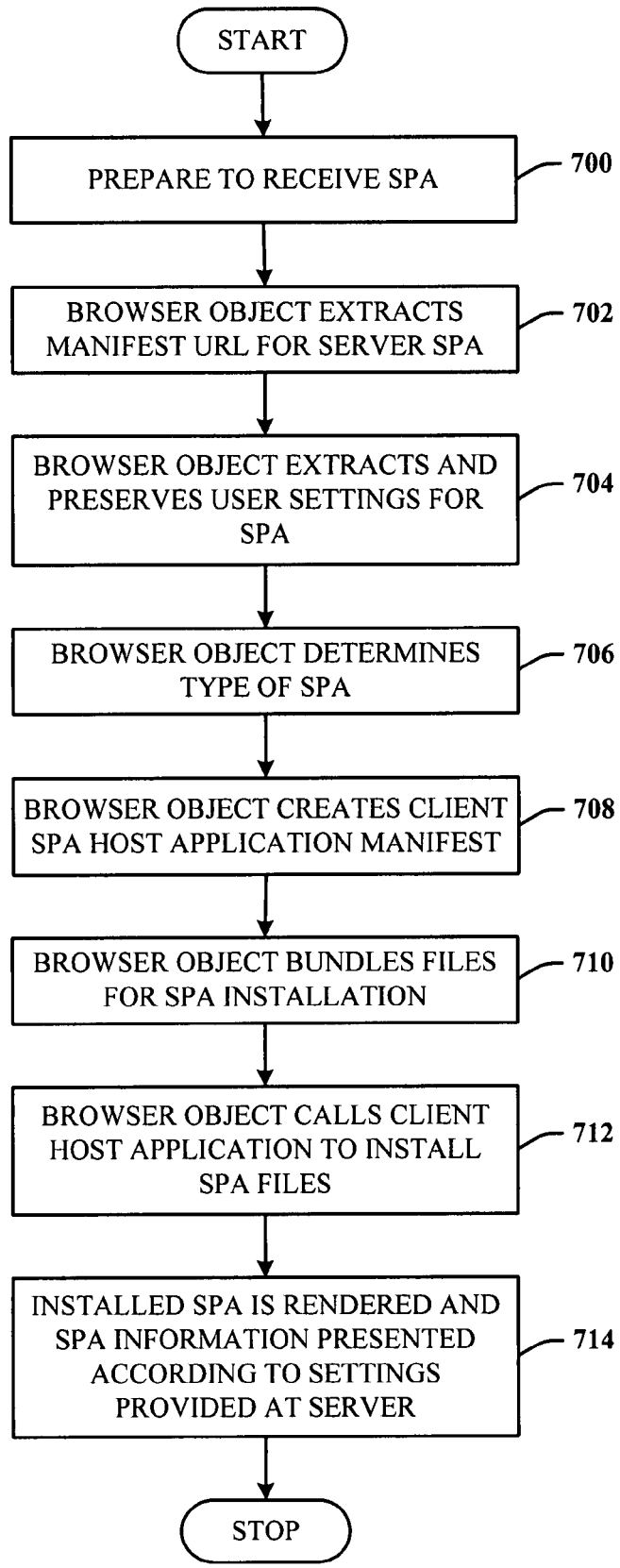
FIG. 7 illustrates a more detailed method of facilitating server-based SPA functionality on a client.

FIG. 7 illustrates a more detailed method of facilitating server-based SPA functionality on a client. At 700, preparation is made to receive a server-based SPA. This can include installing a browser object in the client browser. At 702, the browser object extracts a manifest URL for the server SPA. At 704, the browser object extracts and preserves the user settings for the SPA. At 706, the browser object determines the type of server SPA (e.g., web gadget, RSS gadget, etc.). At 708, the browser object creates a manifest for the client hosting application. At 710, the browser object bundles files at the server for installation of the server-based SPA on the client. At 712, the browser object calls the client hosting application to install the SPA files. At 714, the installed SPA is rendered on the client and the SPA information presented according the settings provided at the server and independent of the server.

Figure 8:
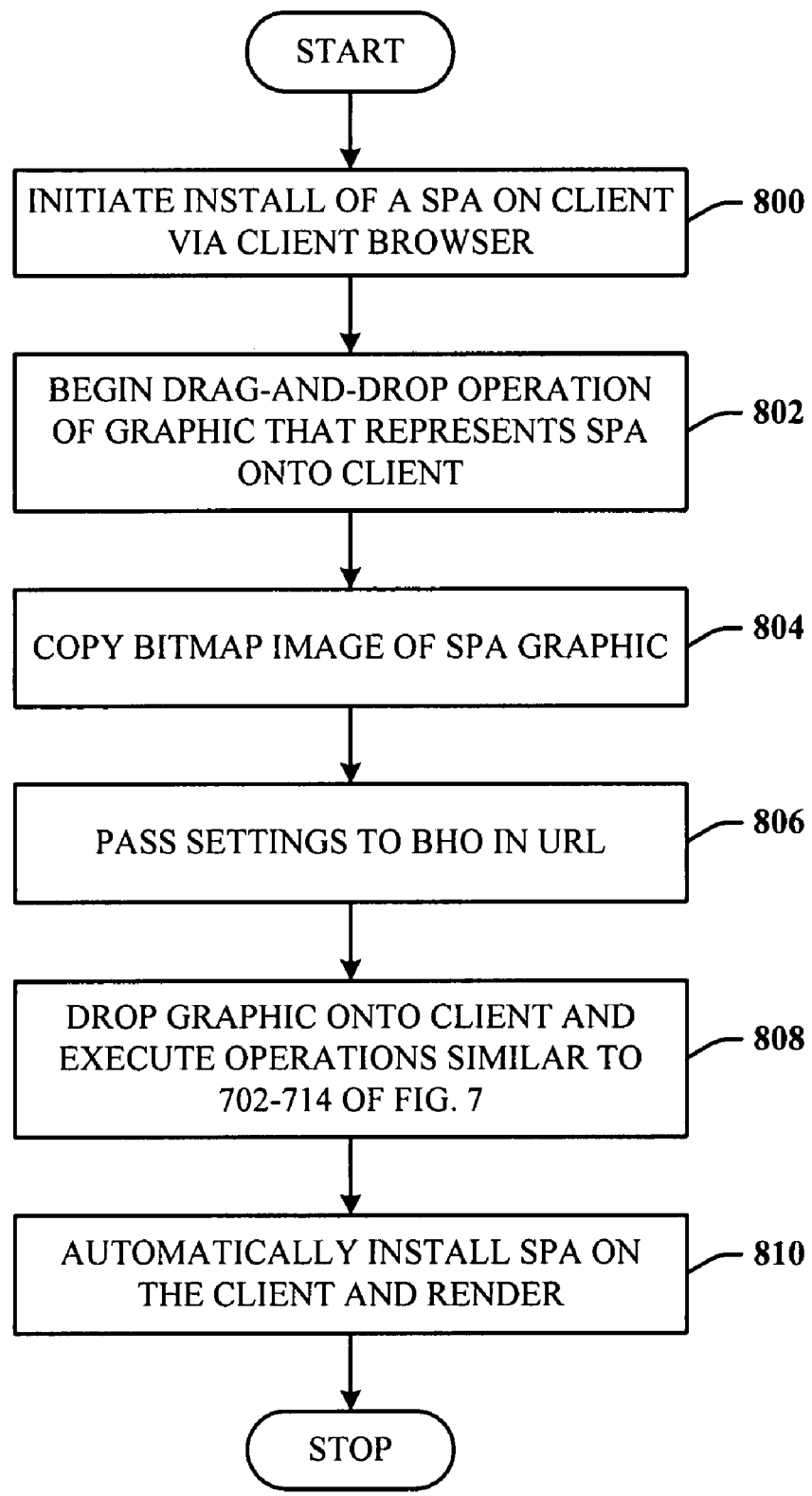
FIG. 8 illustrates a method of processing an SPA according to user download.

FIG. 8 illustrates a method of processing an SPA according to a user download. At 800, the client user initiates installation of the SPA on the client via the client browser. In this particular installation operation, the user implements a drag-and-drop operation. Accordingly, at 802, the user begins the drag-and-drop operation of the graphic (that represents the SPA) onto the client. At 804, a bitmap image of the graphic is copied and presented as a means of feedback to the user during the drag-and-drop operation, while the graphic is being moved onto the client system.

More specifically, when the user starts the drag operation, the client code in the BHO detects this and makes the bitmap, but does not show the bitmap at this time. In order to not interfere with drag/reordering of the tiles associated with the server the BHO waits until the user drags the cursor outside of the browser window. At that time, the BHO cancels the drag at the server (causing the tile to go back to its original position) and then shows the bitmap. Visually, this is seamless so the user does not perceive of the transitioning from the server bitmap to the client bitmap. This can be performed as a foreground process. In one alternative implementation, this can be performed as a background process.

At 806, as part of this user action, the settings are passed to the BHO in a URL. At 808, the graphic is dropped onto the client. At 810, the server-based SPA is automatically installed and rendered on the client. In other words, when the user drops the bitmap onto sidebar area, the same sequence of events is triggered as if the user clicked "add to sidebar" from the context menu. Basically, the same code is executed as described in association with acts 702-714 of FIG. 7. Hence, the "add to sidebar" and "drag drop" are two entry points onto the exact same code.

Figure 9:
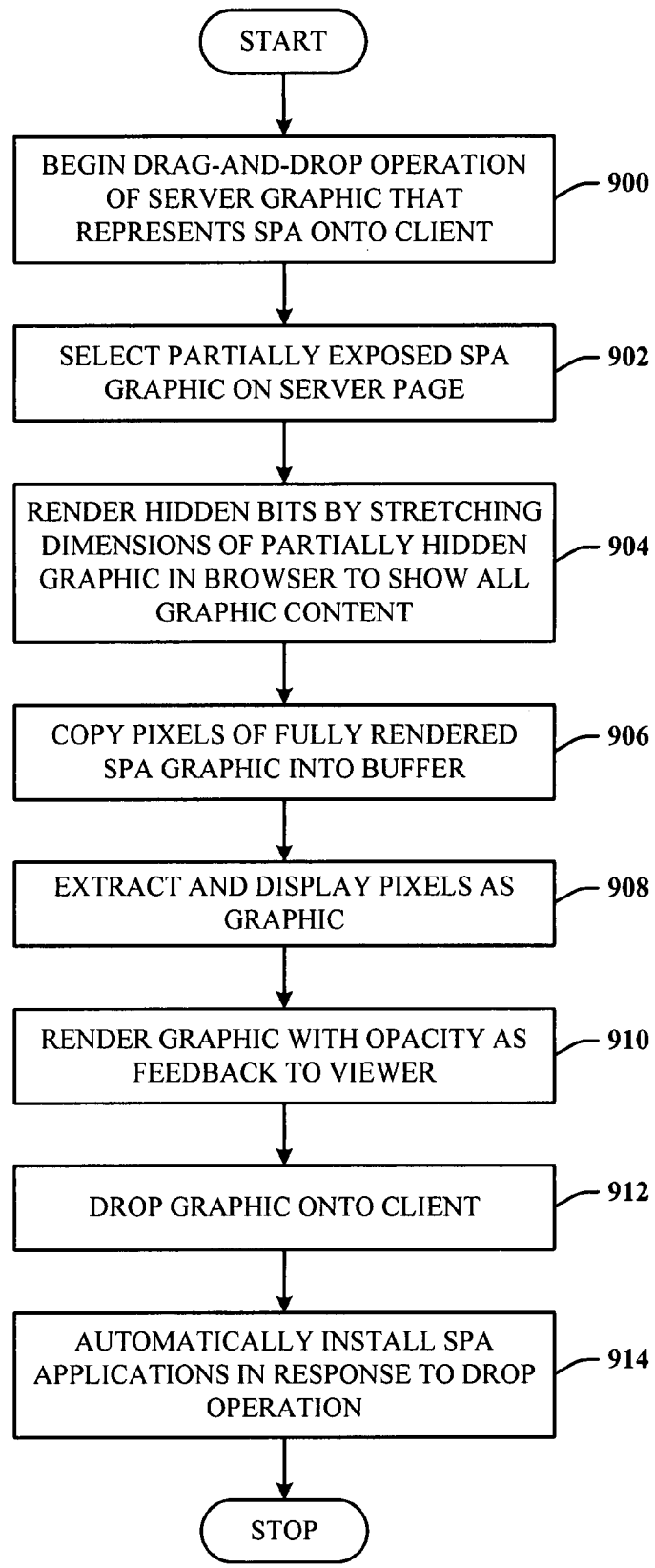
FIG. 9 illustrates a method of dynamically rendering SPA graphics during an installation operation.

FIG. 9 illustrates a method of dynamically rendering SPA graphics during an installation operation. At 900, the user initiates a drag-and-drop operation of a server SPA graphic from the server webpage onto the client. At 902, the graphic is only partially exposed, but selected by the user. At 904, the system renders the hidden bits of the graphic by stretching dimensions of the partially hidden graphic in the client browser to show all graphic content. At 906, the system copies the associated pixels of the fully-exposed rendering into a buffer. At 908, the buffered pixels are then extracted and rendered as the graphic. At 910, the graphic can be rendered with a measure of transparency (or opacity) as a means of feedback to the user. At 912, the user drops the graphic onto the client. At 914, the files and settings necessary to make the server-based graphic functional on the client are downloaded and installed in response to the drop operation, for example. The server SPA is then rendered and made functional on the client by presenting the SPA information to the user.

Figure 10:
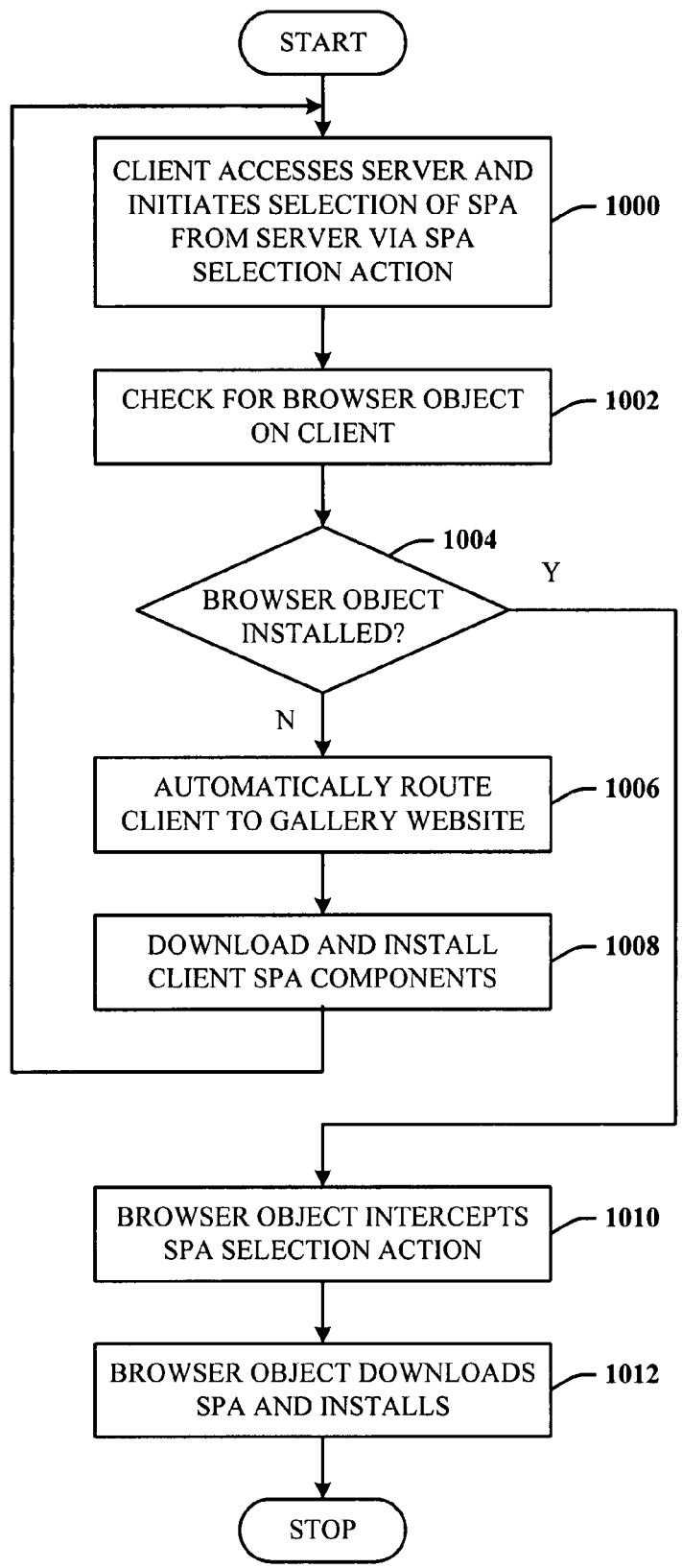
FIG. 10 illustrates a method of detecting and processing file installs for a client.

FIG. 10 illustrates a method of detecting and processing file installs for a client. At 1000, the client accesses a server and initiates selection of a server SPA via a server selection action (e.g., menu). At 1002, a check is made if the client system already includes a browser object file. For example, absence of the browser object on the client allows a request to go through to the server, thereby initiating an installation sequence. At 1004, if not, flow is to 1006 to automatically route the client to a gallery website, for example. At 1008, from the gallery website, the client SPA components (e.g., object 202) are downloaded and installed automatically. Flow can then be back to 1000 to navigate back to the server and continue the select operation. At this time, settings can be requested. In an alternative embodiment, the user settings are requested before a system check is made for the browser object. If the system determines that the client has the minimum files required (e.g., from a previous server-based SPA install process), flow is from 1004 to 1010, where the browser object intercepts the SPA selection action. At 1012, the browser object then downloads the SPA files and settings, and installs the files and settings on the client.

While certain ways of displaying information to users are shown and described with respect to certain figures as screenshots, those skilled in the relevant art will recognize that various other alternatives can be employed. The terms "screen," "screenshot", "webpage," "document", and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 11:
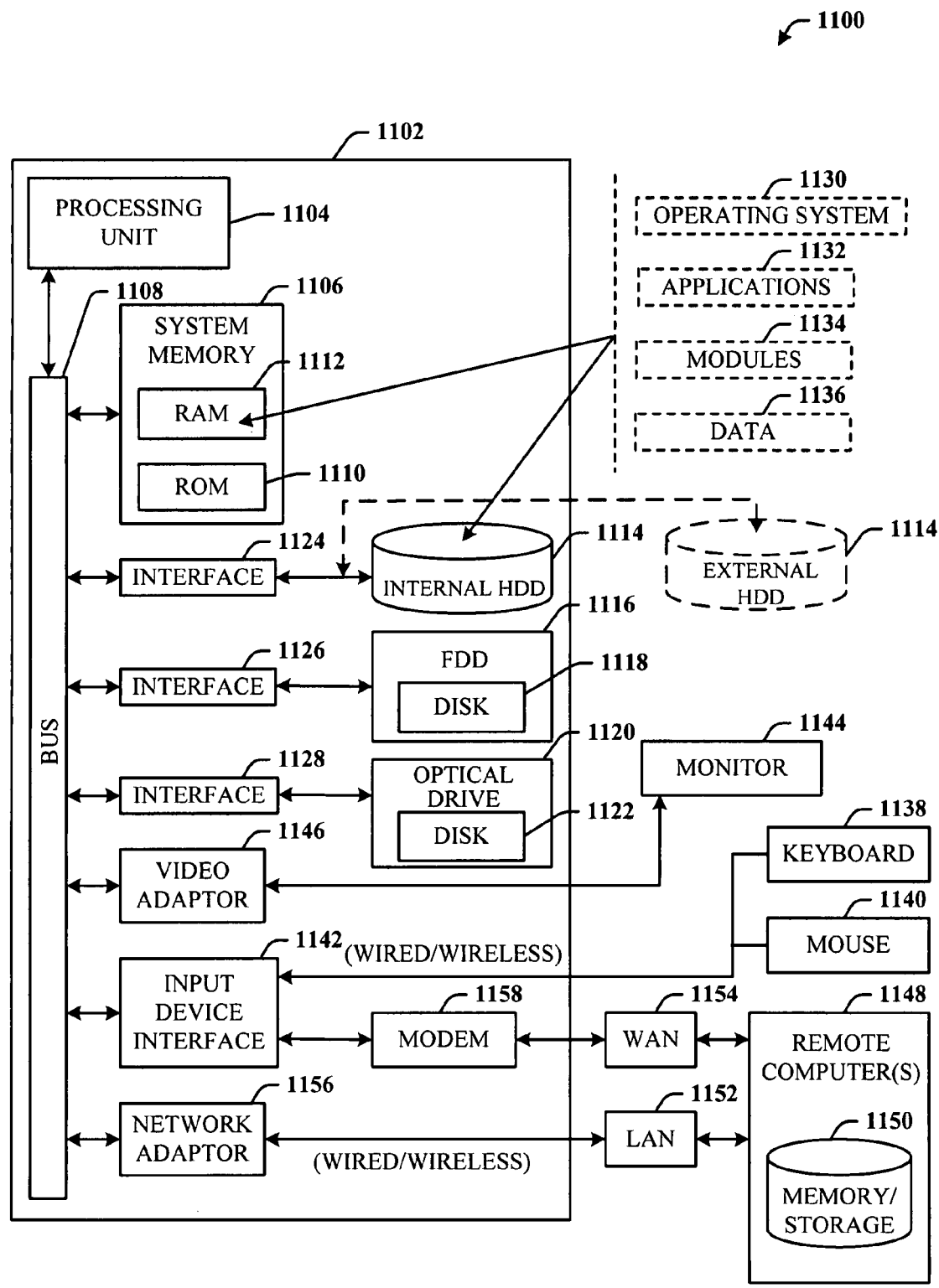
FIG. 11 illustrates a block diagram of a computing system operable to execute SPA (or gadget) processing according to the disclosed architecture.

Referring now to FIG. 11, there is illustrated a block diagram of a computing system 1100 operable to execute SPA (or gadget) processing according to the disclosed architecture. In order to provide additional context for various aspects thereof, FIG. 11 and the following discussion are intended to provide a brief, general description of a suitable computing system 1100 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 11, the exemplary computing system 1100 for implementing various aspects includes a computer 1102, the computer 1102 including a processing unit 1104, a system memory 1106 and a system bus 1108. The system bus 1108 provides an interface for system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a nonvolatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is to be appreciated that the disclosed architecture can be implemented with various commercially available operating systems or combinations of operating systems.

The applications 1132 and/or modules 1134 can include the access component 102, hosting component 110, client-based SPA 106, browser object 200, client SPA 202, object component 204 and webform page 206, for example. The UI 400 can be part of the operation system 1130.

A user can enter commands and information into the computer 1102 through one or more wire/wireless input devices, for example, a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wire and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the local network 1152 through a wire and/or wireless communication network interface or adapter 1156. The adaptor 1156 may facilitate wire or wireless communication to the LAN 1152, which may also include a wireless access point disposed thereon for communicating with the wireless adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Figure 12:
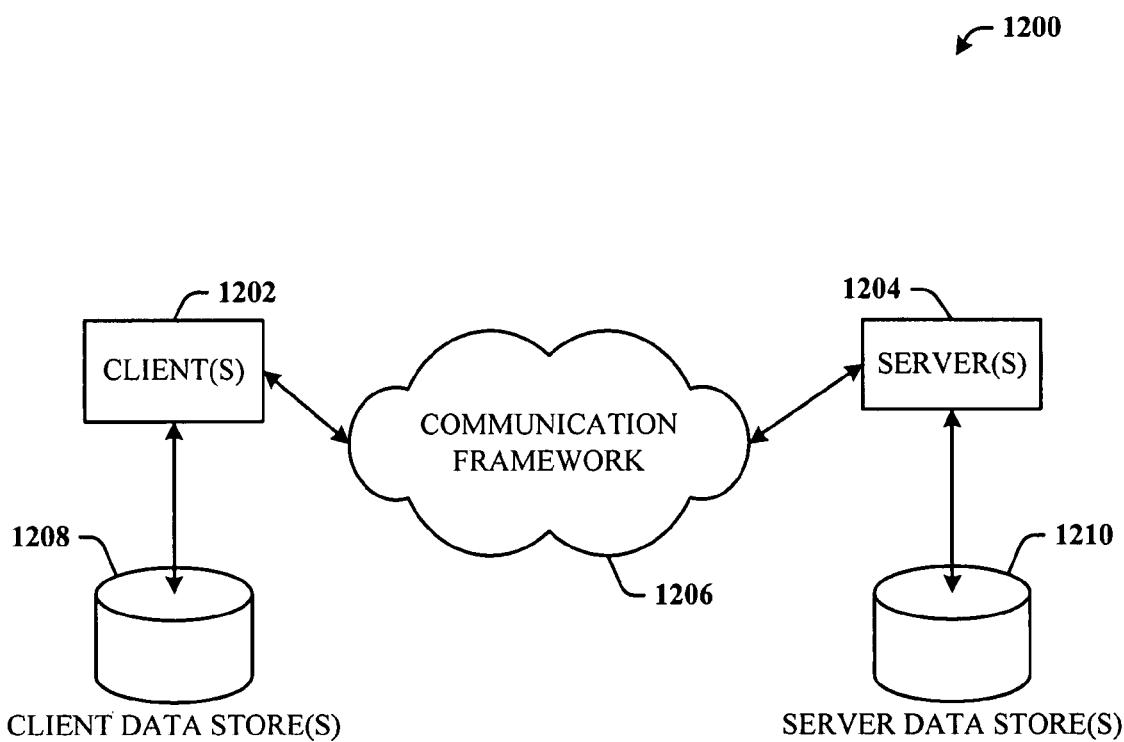
FIG. 12 illustrates a schematic block diagram of an exemplary computing environment for SPA (or gadget) processing in accordance with the disclosed architecture.

Referring now to FIG. 12, there is illustrated a schematic block diagram of an exemplary computing environment 1200 for SPA (or gadget) processing in accordance with the disclosed architecture. The system 1200 includes one or more client(s) 1202. The client(s) 1202 can be hardware and/or software (e.g., threads, processes, computing devices). The client(s) 1202 can house cookie(s) and/or associated contextual information, for example.

The system 1200 also includes one or more server(s) 1204. The server(s) 1204 can also be hardware and/or software (e.g., threads, processes, computing devices). The servers 1204 can house threads to perform transformations by employing the architecture, for example. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wire (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204. The client(s) 1202 can comprise the client 104 and the server(s) can comprise the server 108.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented method of managing applications, comprising:
    receiving input identifying a server-based single purpose application (SPA) hosted at a remote location;
    extracting a URL manifest of the remote location and creating a client manifest based on settings comprised in the URL manifest;
    installing a client-based version of the server-based SPA onto a client based at least in part on at least one of the extracted URL manifest and the client manifest; and
    automatically rendering a selected graphic of the server-based SPA, which is a partially exposed graphic at the remote location, as a fully dimensioned representation during a drag-and-drop operation from the remote location to the client, at least some of the remote location represented within a browser, the drag-and-drop operation performed as part of the installing the client-based version of the server-based SPA onto the client.

2. The method of claim 1, receiving input identifying the server-based SPA comprising receiving input that the server-based SPA has been dragged from a user interface depicting the remote location to a user interface depicting the client.

3. The method of claim 2, comprising rendering the selected graphic of the server-based SPA as a temporary semi-opaque graphic during the dragging of the server-based SPA.

4. The method of claim 1, the selected graphic of the server-based SPA automatically rendered as the fully dimensional representation for the duration of the drag-and-drop operation from the remote location to the client.

5. The method of claim 1, comprising automatically routing the client to a server page for download of one or more files based on a selection process at the remote location.

6. The method of claim 1, comprising at least one of:
    automatically downloading SPA settings from the remote location to the client;
    automatically packaging one or more installation support files for the server-based SPA into an installation file;
    accessing one or more server-based SPAs with a scroll; and
    prohibiting the server-based SPA from accessing one or more namespaces.

7. The method of claim 1, comprising providing access to a server object model framework and a client object model framework for the client-based version of the server-based SPA.

8. A tangible computer storage memory comprising computer executable instructions that when executed via a processor perform a method of managing applications, comprising:
    automatically performing the following upon receipt of input identifying a server-based single purpose application (SPA):
        packaging one or more installation support files for the server-based SPA into an installation file; and
        installing a client-based version of the server-based SPA onto a client based at least in part on at least some of the installation file; and
    selectively suppressing presentation of information associated with the server-based SPA in the client-based version of the server-based SPA based upon whether the client-based version of the server-based SPA is docked by being fixed at a location on a user interface.

9. The computer storage memory of claim 8, the method comprising at least one of:
    suppressing presentation of a header section and a footer section associated with the server-based SPA when the client-based version of the server-based SPA is docked; and
    presenting the header section and the footer section associated with the server-based SPA when the client-based version of the server-based SPA is undocked.

10. The computer storage memory of claim 8, the method comprising:
    presenting a title associated with the server-based SPA when the client-based version of the server-based SPA is docked.

11. The computer storage memory of claim 8, the method comprising extracting a URL manifest of a remote location associated with the server-based SPA and creating a client manifest based on settings comprised in the URL manifest.

12. A system comprising:
    one or more processing units; and
    memory comprising instructions that when executed at least in part via at least some of the one or more processing units perform a method, comprising:
        automatically performing the following upon receipt of input identifying a server-based single purpose application (SPA):
            packaging one or more installation support files for the server-based SPA into an installation file; and
            installing a client-based version of the server-based SPA onto a client based at least in part on at least some of the installation file; and
        selectively suppressing presentation of information associated with the server-based SPA in the client-based version of the server-based SPA based upon whether the client-based version of the server-based SPA is docked by being fixed at a location on a user interface.

13. The system of claim 12, the server-based SPA hosted at a remote location.

14. The system of claim 13, the method comprising extracting a URL manifest of the remote location and creating a client manifest based on settings comprised in the URL manifest.

15. The system of claim 14, the installing based at least in part on at least one of the extracted URL manifest and the client manifest.

16. The system of claim 12, the method comprising rendering a selected graphic of at least one of a first appearance and a second appearance of at least one of the server-based SPA and the client-based version of the server-based SPA.

17. The system of claim 16, the first appearance rendered when the selected graphic is dragged.

18. The system of claim 16, the second appearance rendered when the selected graphic is over a docking area.

19. The system of claim 16, the first appearance rendered with a first level of transparency and the second appearance rendered with a second level of transparency, different than the first level of transparency.

20. The system of claim 19, the first level of transparency about 50% opacity, and the second level of transparency about 100% opacity.

* * * * *